US009330294B2

(12) United States Patent
Riopka et al.

(10) Patent No.: US 9,330,294 B2
(45) Date of Patent: May 3, 2016

(54) SYSTEM AND METHOD OF CAPTURING AND PRODUCING BIOMETRIC-MATCHING QUALITY FINGERPRINTS AND OTHER TYPES OF DACTYLOGRAPHIC IMAGES WITH A MOBILE DEVICE

(71) Applicant: Aware, Inc., Bedford, MA (US)

(72) Inventors: Taras P. Riopka, Concord, MA (US); Robert Mungovan, Needham, MA (US); Limin Ma, Lowell, MA (US); David Benini, Charlestown, MA (US)

(73) Assignee: AWARE, INC., Bedford, MA (US)

( * ) Notice: Subject to any disclaimer, the term of this patent is extended or adjusted under 35 U.S.C. 154(b) by 54 days.

(21) Appl. No.: 14/363,852

(22) PCT Filed: Jan. 26, 2013

(86) PCT No.: PCT/US2013/023329
§ 371 (c)(1),
(2) Date: Jun. 9, 2014

(87) PCT Pub. No.: WO2013/112964
PCT Pub. Date: Aug. 1, 2013

(65) Prior Publication Data
US 2014/0369575 A1    Dec. 18, 2014

Related U.S. Application Data

(60) Provisional application No. 61/590,836, filed on Jan. 26, 2012, provisional application No. 61/682,346, filed on Aug. 13, 2012.

(51) Int. Cl.
*G06K 9/00* (2006.01)
*G02B 21/00* (2006.01)

(52) U.S. Cl.
CPC ........ *G06K 9/00046* (2013.01); *G02B 21/0008* (2013.01)

(58) Field of Classification Search
None
See application file for complete search history.

(56) References Cited

U.S. PATENT DOCUMENTS 5,732,148 A * 3/1998 Keagy ................ G06K 9/00046
356/71
6,134,340 A * 10/2000 Hsu ...................... G06K 9/6203
382/124

(Continued)

FOREIGN PATENT DOCUMENTS

KR    1020040081068 A    9/2004

OTHER PUBLICATIONS

International Preliminary Report on Patentability in counterpart international patent application No. PCT/US13/23329, mailed on Aug. 7, 2014.

(Continued)

*Primary Examiner* — Daniel Mariam
(74) *Attorney, Agent, or Firm* — Jason H. Vick; Sheridan Ross, PC

(57) ABSTRACT

An optical module includes a housing with a lighting mechanism, an aperture formed therein, and a window that frames a transparent surface adapted to contact a skin surface of a person, for example, a fingertip. The lighting mechanism provides light to illuminate the skin surface placed upon the transparent surface. A prism has a first side facing the lighting mechanism, a second side at the window, and a third side through which a dactylographic image exits the prism. One or more light reflecting surfaces are disposed within the housing to reflect the dactylographic image towards the housing aperture. The optical module is coupled to a mobile device having a camera, with the aperture of the housing aligning with a lens of the camera. The camera acquires the dactylographic image, and the mobile device adjusts this dactylographic image to produce a dactylographic image suitable for biometric matching.

56 Claims, 15 Drawing Sheets

(56) References Cited

U.S. PATENT DOCUMENTS

| | | | | |
|---|---|---|---|---|
| 6,983,062 | B2* | 1/2006 | Smith | G06K 9/036 |
| | | | | 348/229.1 |
| 7,647,505 | B2* | 1/2010 | Yudasaka | G06K 19/07 |
| | | | | 713/166 |
| 2002/0138438 | A1 | 9/2002 | Bardwell | |
| 2003/0135764 | A1 | 7/2003 | Lu | |
| 2006/0018519 | A1* | 1/2006 | Siegel | G06K 9/00013 |
| | | | | 382/116 |
| 2006/0104484 | A1* | 5/2006 | Bolle | G06K 9/00885 |
| | | | | 382/115 |
| 2007/0189586 | A1* | 8/2007 | Monden | G06K 9/036 |
| | | | | 382/124 |
| 2008/0247613 | A1 | 10/2008 | Chang | |
| 2009/0103788 | A1 | 4/2009 | Maase | |
| 2010/0289886 | A1 | 11/2010 | Fenrich et al. | |
| 2012/0147168 | A1 | 6/2012 | Shin et al. | |

OTHER PUBLICATIONS

International Search Report & Written Opinion in international patent application No. PCT/US13/23329, mailed on May 15, 2013; 16 pages.

* cited by examiner

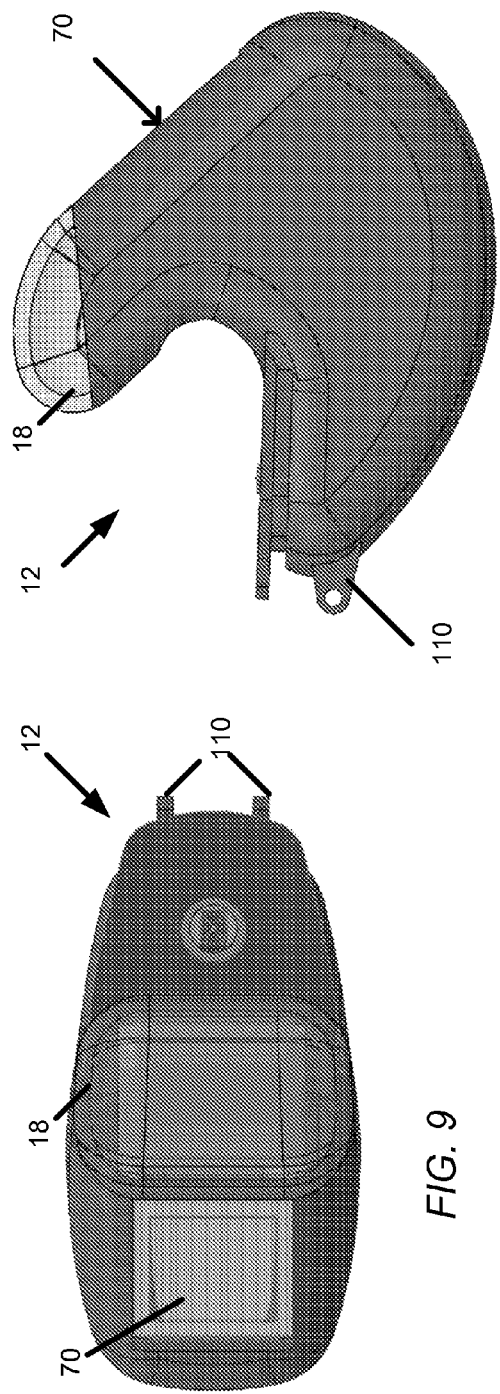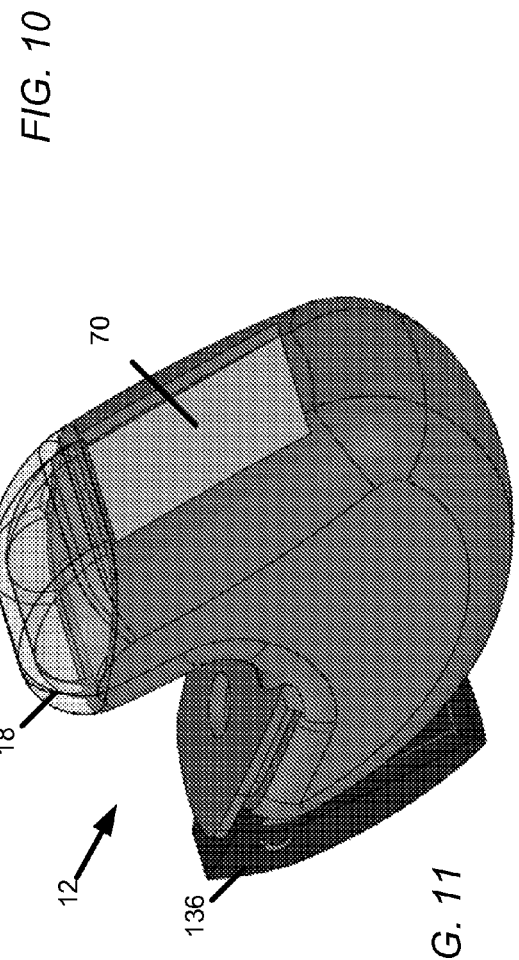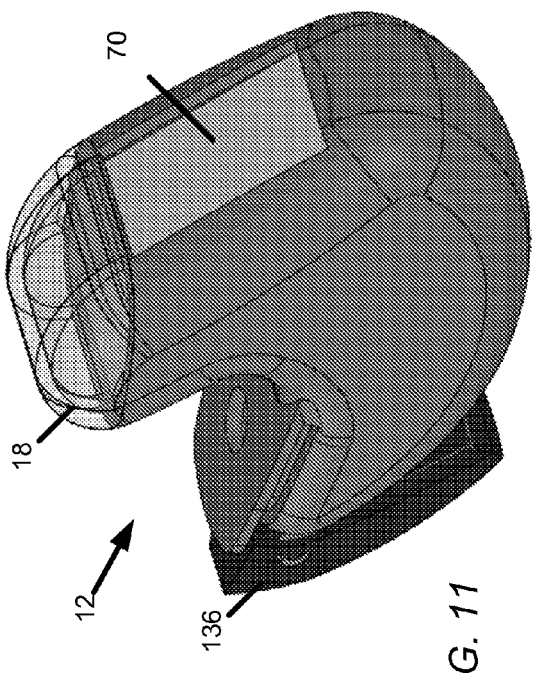
FIG. 10
FIG. 11
FIG. 9

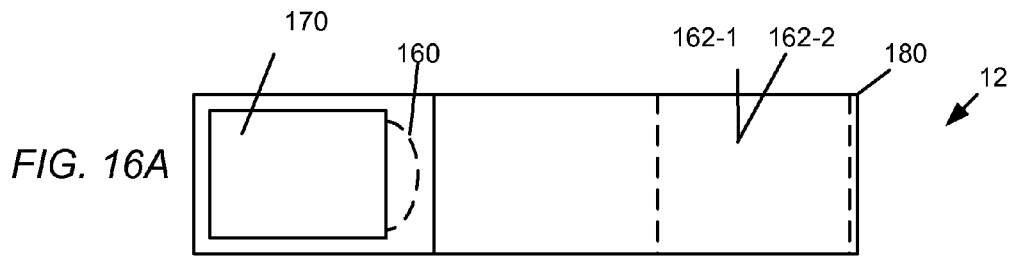
FIG. 16A
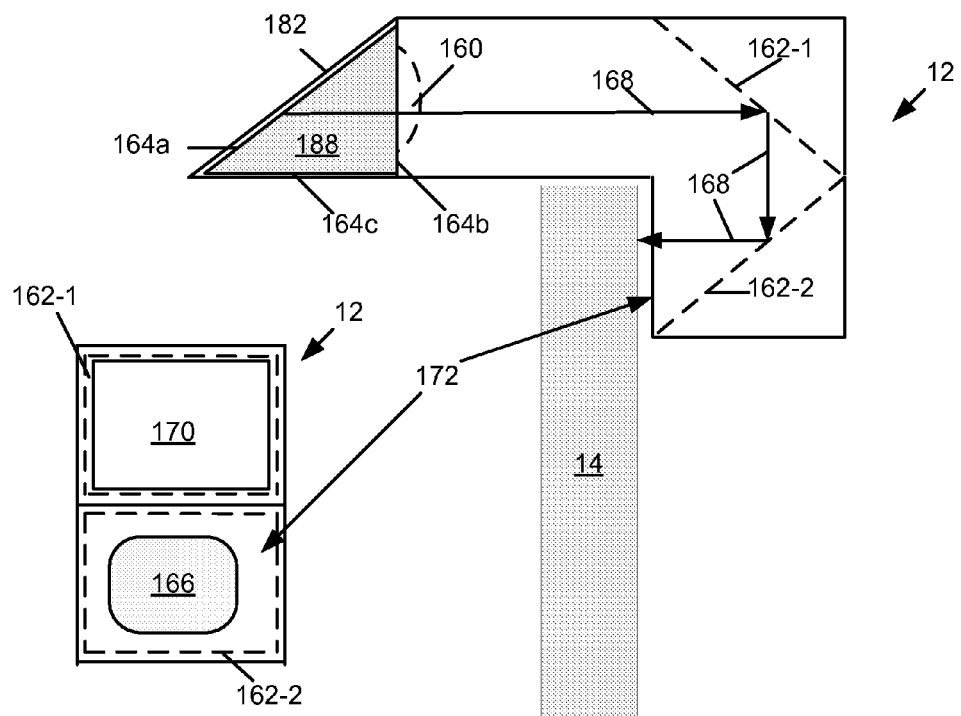
FIG. 16C
FIG. 16B
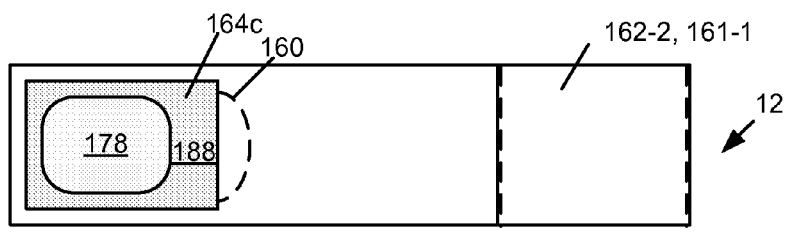
FIG. 16D

SYSTEM AND METHOD OF CAPTURING AND PRODUCING BIOMETRIC-MATCHING QUALITY FINGERPRINTS AND OTHER TYPES OF DACTYLOGRAPHIC IMAGES WITH A MOBILE DEVICE

RELATED APPLICATIONS

This application is a national stage application under 35 U.S.C. 371 of PCT application No. PCT/US2013/023329 having an international filing of Jan. 26, 2013, which designated the United states, which PCT application claims the benefit of and priority to U.S. Provisional Application No. 61/590,836, filed Jan. 26, 2012, titled "System and Method of Capturing and Producing Biometric-Matching Quality Fingerprints through a Mobile Device", and to U.S. Provisional Application No. 61/682,346, filed Aug. 13, 2012, titled "System and Method of Capturing and Producing Biometric-Matching Quality Fingerprints through a Mobile Device", the entireties of which applications are incorporated by reference herein.

FIELD OF THE INVENTION

The invention relates generally to dactylographic systems. More specifically, the invention relates to systems and methods of capturing and producing biometric-matching quality dactylographic images with a mobile device.

BACKGROUND

Fingerprints are well known for their use in personal biometric identification and verification applications. Fingerprinting can often be encumbered by having to bring the person to be fingerprinted to a fingerprinting station. This process can be inconvenient and time consuming Fingerprinting "in the field" is thought to be a potential alternative by which to perform the task in real time, thereby avoiding the inconvenience and the consequent time delay.

SUMMARY

In one aspect, the invention features an optical module comprising a housing with a lighting mechanism, a side with an aperture formed therein, and a window framing a transparent surface used to contact a skin surface of a person. The lighting mechanism is adapted to provide light that illuminates the skin surface of the person placed upon the transparent surface. The optical module further comprises a prism having a first side facing the lighting mechanism, a second side facing the window that frames the transparent surface used to contact the skin surface of the person, and a third side through which a dactylographic image of the skin surface of the person exits the prism. A plurality of light reflecting surfaces is within the housing, spatially separated from the prism. The plurality of light reflecting surfaces is disposed within the housing to reflect the dactylographic image of the skin surface of the person exiting the prism towards the aperture in the side of the housing.

In another aspect, the invention features a method for acquiring a dactylographic image comprising: acquiring, by a camera of a mobile device, a dactylographic image of a skin surface of a person, and adjusting, by the mobile device, the acquired dactylographic image to produce a dactylographic image of a quality suitable for biometric matching.

In still another aspect, the invention features a mobile device comprising a camera, memory storing program code that, when executed, processes images of skin surfaces of people acquired by the camera, and a processor configured to execute program code stored in the memory in response to the camera acquiring a dactylographic image of a skin surface of a person. The processor, in response to executing the program code, adjusts the acquired dactylographic image of the skin surface of a person to produce a dactylographic image of a quality suitable for biometric matching.

In yet another aspect, the invention features a dactylographic image-capture system comprising a mobile device with a native camera having a lens, memory storing program code that, when executed, processes dactylographic images of skin surfaces of people acquired by the camera, and a processor configured to execute program code stored in memory in response to the camera acquiring a dactylographic image of a skin surface of a person, the processor, in response to executing the program code, adjusting the acquired dactylographic image of the skin surface of the person to produce a dactylographic image of a quality suitable for biometric matching.

The dactylographic image-capture system further comprises an optical module that is coupled to the mobile device. The optical module comprises a housing with a lighting mechanism, a side with an aperture formed therein, and a window framing a transparent surface used to contact the skin surface of the person. The lighting mechanism is adapted to provide light to illuminate the skin surface of the person placed upon the transparent surface. The optical module further comprises a prism having a first side facing the lighting mechanism, a second side facing the window that frames the transparent surface used to contact the skin surface of the person, and a third side through which a dactylographic image of the skin surface of the person exits the prism. The optical module further comprises a plurality of light reflecting surfaces within the housing spatially separated from the prism. The one or more light reflecting surfaces are disposed within the housing to reflect the dactylographic image of the skin surface exiting the prism towards the aperture in the side of the housing. The lens of the native camera of the mobile device aligns with the aperture in the side of the housing to receive the dactylographic image of the skin surface passing therethrough.

In yet another aspect, the invention features an optical module comprising a housing with a diffuser window adapted to diffuse ambient light, a frame portion with an aperture, and a second window framing a transparent surface used to contact a skin surface of a person. The frame portion is adapted to couple to a mobile device with a built-in camera such that the aperture of the frame portion aligns with a lens of the camera of the mobile device. A prism is disposed in the housing with a first side of the prism at the second window and a second side of the prism facing the diffuser window. The diffused ambient light entering the housing through the diffuser window illuminates the skin surface of the person that is in contact with the transparent surface. A lens is disposed within the housing to focus a dactylographic image of the skin surface that exits the prism and propagates towards the aperture in the frame portion.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 9 is a top down view of the optical module of FIG. 5.

FIG. 10 is a side view of the optical module of FIG. 5.

FIG. 11 is an isometric front view of the optical module of FIG. 5.

FIG. 16A is a diagram illustrating a top view of another embodiment of an optical module with a transparent surface.

FIG. 16B is a side view of the optical module of FIG. 16A, wherein the end with the transparent surface has a sloped side.

FIG. 16C is the optical module of FIG. 16A from the sloped end with the transparent surface.

FIG. 16D is a bottom view of the optical module of FIG. 16A, with a diffuser window at the sloped end of the optical module.

DETAILED DESCRIPTION

The optical modules, software system, and processes described herein facilitate convenient, "in the field" fingerprint-based enrollment, identification, and verification operations using a mobile device. The mobile device is configured with a software system that is used in conjunction with an optical module to capture and process fingerprint images and to produce therefrom high-quality fingerprint images suitable for biometric matching. Because the capture of fingerprint images can occur in a minimally controlled lighting environment, the software system running on the mobile device applies certain image processing techniques to improve the quality of the image and minimize false match and non-false match rates. To compensate for the uncontrolled, non-homogeneous lighting of the fingerprint, one or more fingerprint images may be acquired, adaptively enhanced, and merged to create a single illumination-normalized fingerprint image. Various optical modules described herein used with a mobile device are lightweight (in terms of ounces) and small, typically measuring less than four inches in length, approximately one inch in height, and approximately one inch in width.

Although described herein predominantly with use in the acquisition and processing of fingerprint images, the described embodiments of optical modules and software system can be adapted to acquire various types of dactylographic images which include, but are not limited to, one or more, full or partial fingerprints, thumbprints, palm prints, or footprints (e.g., plantar prints). For purposes of readability, references herein made to a dactylographic image encompass each of these types of dactylographic images. Also for purposes of readability, those principles described in this detailed description in connection with fingerprints shall be understood to apply also to the other types of dactylographic images.

Figure 1:
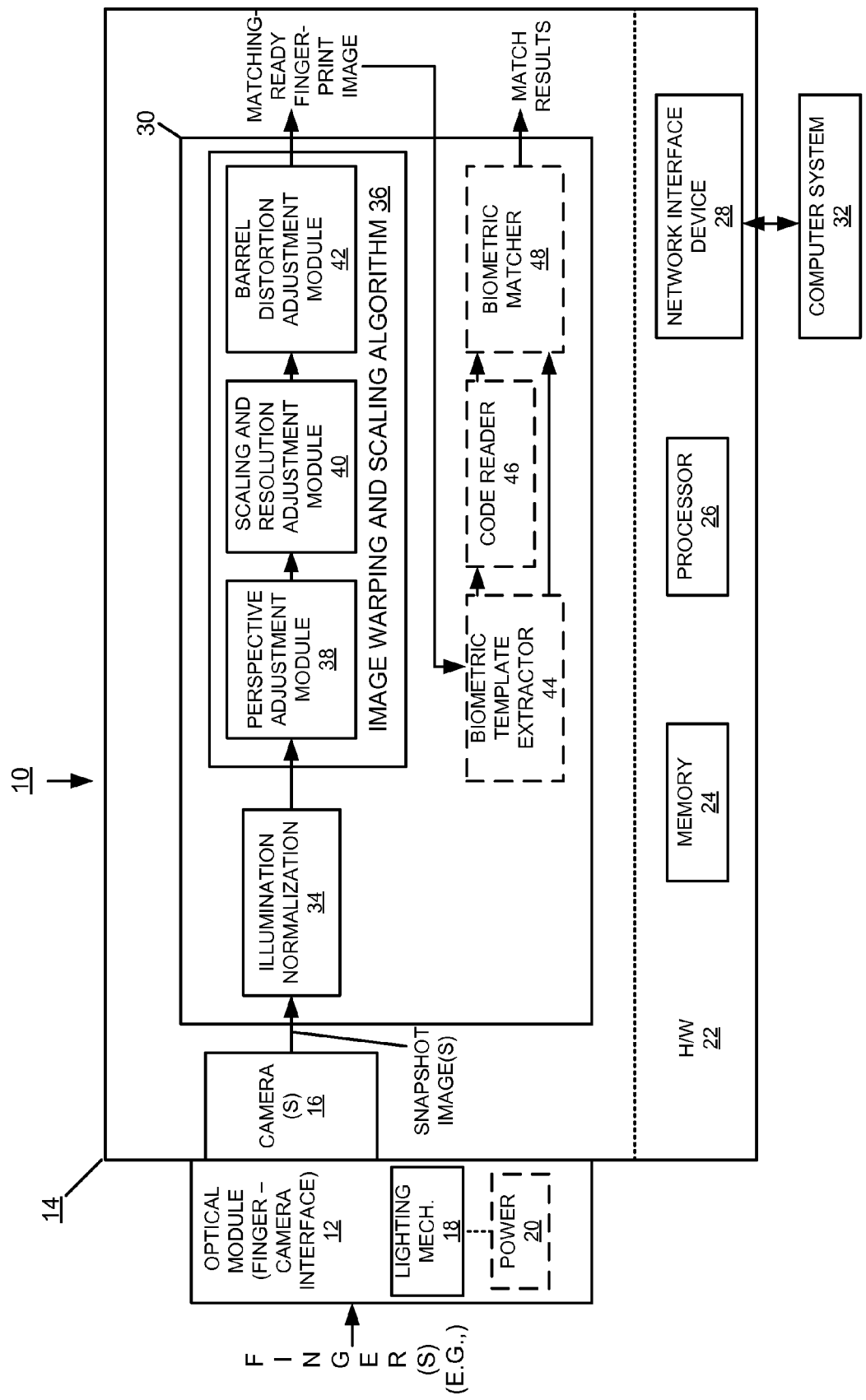
FIG. 1 is a block diagram of an embodiment of a dactylographic image acquisition system including an optical module coupled to a mobile device.

FIG. 1 shows a functional block diagram of an embodiment of a dactylographic image acquisition system 10 comprised of an optical module 12 coupled to a mobile device 14 having one or more built-in (i.e., native) cameras 16. The optical module 12 can be designed for detachable attachment to any of a variety of mobile devices having one or more cameras. Examples of mobile devices for which the optical module 12 can be customized, as described herein, include smart phones (e.g., the Apple iPhone™, RIM Blackberry™, Samsung Galaxy™ phones, and Google Android™ phones), tablets (e.g., the Apple iPad™), and portable media players (e.g., Apple iPod Touch™). Means for attachment include a mobile device frame, fastened or mounted to the optical module 12, into which the mobile device 14 can snap or slide and be securely held in place during the photographing of the fingerprint as described herein.

The optical module 12 operates as a finger-to-camera interface and includes a lighting mechanism 18 for illuminating the skin surface (e.g., fingertip) of the user during the fingerprint capture process. In one embodiment, the optical module 12 is a passive device, meaning the optical module 12 needs no electrical power for its operation, wherein the lighting mechanism 18 comprises a diffuser window that allows diffused ambient light to enter the optical module 12. In another embodiment, the lighting mechanism 18 requires electrical power, for example, one or more LEDs. In this embodiment, the optical module 12 has a power source 20, for example, one or more solar cells or one or more batteries.

In addition to the one or more cameras, the mobile device 14 comprises hardware 22, including memory 24, a processor 26, a network interface 28, and a software system 30 that runs on the mobile device 14 to process captured fingerprint images and to produce therefrom high-quality fingerprints suitable for biometric matching. Without the processing performed by the software system 30, the fingerprints captured by the camera of the mobile device would be unsuitable for biometric matching. For one, the native camera system of the mobile device 14 is not designed to produce monochromatic close-up images of fingerprints (for example) at 500 ppi to 1000 ppi resolution, whereas the software system 30 is designed towards this end.

The memory 24 stores the program code associated with the software system 30 and the processor 26 executes the program code to accomplish the fingerprint capture process, as described herein. The network interface 28 enables the mobile device 14 to communicate with a computer system 32, for purposes of downloading data from the computer system 32 or uploading data to the computer system 32 as described herein. Such communication can be over a wired or wireless communication links. Example embodiments of the wireless communication link include, but are not limited to, satellite communication links and radio frequency (RF) links.

In brief, the software system 30 includes an illumination normalization algorithm 34 to correct for the non-homogeneous lighting produced by the natural environment in which a snapshot of the fingerprint is taken, and an image warping and scaling algorithm 36 to compensate for distortions due to perspective, magnification, and camera barrel distortion. More specifically, the image-warping and scaling algorithm 36 includes a perspective adjustment module 38, which compensates for the perspective distortion caused by the angled prism 88 (e.g., FIG. 3) of the unpowered optical module 12 used to acquire the fingerprint, a scaling and resolution adjustment module 40, which compensates for the magnification performed by the lens 92 (e.g., FIG. 3), and a barrel distortion adjustment module 42 to compensate for barrel distortion and magnification introduced by the camera 16 in the mobile device 14. Other software modules of the software system 30 can include a biometric template extractor 44, a code reader 46, and a biometric matcher 48.

A calibration process determines parameters used by the image-warping and scaling algorithm 36 during the image processing. Such parameters depend upon the design of the optical module 12 (e.g., the distance of a mirror from the lens) and on the type of mobile device (e.g., the camera lens location on the mobile device, focal length, magnification and barrel distortion).

During the calibration process, the camera 16 of the mobile device 14 captures an image from a predetermined calibration object (using the particular optical module designed for that model of mobile device). This image captured by the camera of the mobile device is subsequently compared with a calibrated image (preloaded on the mobile device); certain points in the captured image are compared with corresponding points in the calibrated image. From this comparison, the software system 30 generates and stores a configuration file of parameter values in the memory 24 of the mobile device 14, to be used in the processing of subsequently captured fingerprint images.

The calibration process can also compensate for image reproduction variance caused by mobile device manufacturing inconsistencies, by making use of data from a statistical analysis of the mobile device manufacturing error to determine an optimal image acquisition process.

The calibration process can be run once for each type of mobile device (e.g., at manufacture, one configuration file for each brand of Android™ smart phone, another configuration file for iPhones™, etc.). The necessary calibration configuration file can then be automatically downloaded from a web service during setup (to ensure an up-to-date version), or supplied with the mobile device, to be loaded onto the mobile device during setup. Alternatively, users can calibrate their own mobile devices individually, prior to first use of the mobile device for capturing a fingerprint image.

The result from the image acquisition is one or more processed monochromatic fingerprint images at a 500 ppi or 1000 ppi resolution (depending on the biometric matcher requirements). Each resulting fingerprint image is thus suitable for biometric matching applications.

The dactylographic image capture system 10 for capturing and producing high-quality fingerprint images can be used in conjunction with other biometric applications. Such applications, in addition to collecting "live" fingerprints "in the field", can also collect other optional data, including biographic information, acquire biometric samples, including face images and iris images. A camera of the mobile device (whether the same camera used to capture the fingerprints or, preferably a second camera facing the opposite side of the mobile device) can acquire these other biometric samples or read in biometric data from QR codes or bar codes or some other graphical representation of biometric data.

These other biometric applications include, but are not limited to:

1) Biometric verification, which is a process by which a single set (derived from a single person) of one (unimodal) or more (multimodal) live biometric samples is compared to a single "reference" set of one or more biometric samples in order to ascertain their similarity and thus whether they belong to the same person;

2) Biometric identification, which is a process by which a single "probe" set of one or more live biometric samples is compared to a "gallery" of multiple sets of one or more biometric samples, in order to ascertain which set in the gallery is most likely to belong to the same individual as that of the probe; and 3) Biometric enrollment, which is a process by which biometric data such as fingerprints, facial images, or iris images are collected using the mobile device, along with biographic data such as name and contact information. This data is then either stored locally or transmitted by a network connection to a database containing a biometric gallery.

The biometric applications can involve any one or more of the following matching modes. These modes are differentiated from each other by where the reference biometric sample or biometric sample gallery resides and where the biometric comparison occurs.

1) Match-to-device. In this mode, the reference biometric sample or gallery of biometric samples resides on the mobile device 14. The biometric comparison is performed on the mobile device 14 and the user is informed of the comparison result through a software application user interface running on the mobile device 14.

2) Match-to-code. In this mode, the reference biometric sample is encoded in a QR (Quick Response) code or bar code that is either printed on a surface or displayed on a screen. A camera on the mobile device is used to take a photograph of the code and then the mobile device decodes the biometric sample data from the photograph. A comparison is then made between the live biometric sample data and the data stored in the code. The comparison result is reported to the user through a software application user interface running on the mobile device 14.

3) Match-to-chip. In this mode, the reference biometric sample is encoded on a chip, such as is found on a smart card used as a credential. The mobile device 14 uses near field communication (NFC) to communicate with the chip on the smart card and retrieve the reference biometric sample. The mobile device 14 then performs a comparison between the live sample data and the reference biometric sample. The comparison result is reported to the user through a software application user interface running on the mobile device 14.

4) Match-to-server. In this mode, the reference sample or gallery of samples resides on an external computer system (e.g., 32), preferably within physical proximity of the mobile device 14. The mobile device 14 communicates with the computer system 32 over a network connection established between the mobile device 14 and the computer system 32 using, for example, a wireless technology such as GSM, wifi, or Bluetooth. After establishing a network connection with the computer system 32, the mobile device 14 retrieves either a reference sample or gallery and performs biometric comparison for verification or identification at the mobile device 14. Alternatively, the mobile device 14 submits the live probe sample to the computer system 32, where a biometric reference sample or gallery resides, and where the comparison to the reference or gallery is performed. In this instance, the computer system 32 can return the comparison result to the mobile device 14, which is then reported to the user through a software application user interface running on the mobile device 14.

Figure 2:
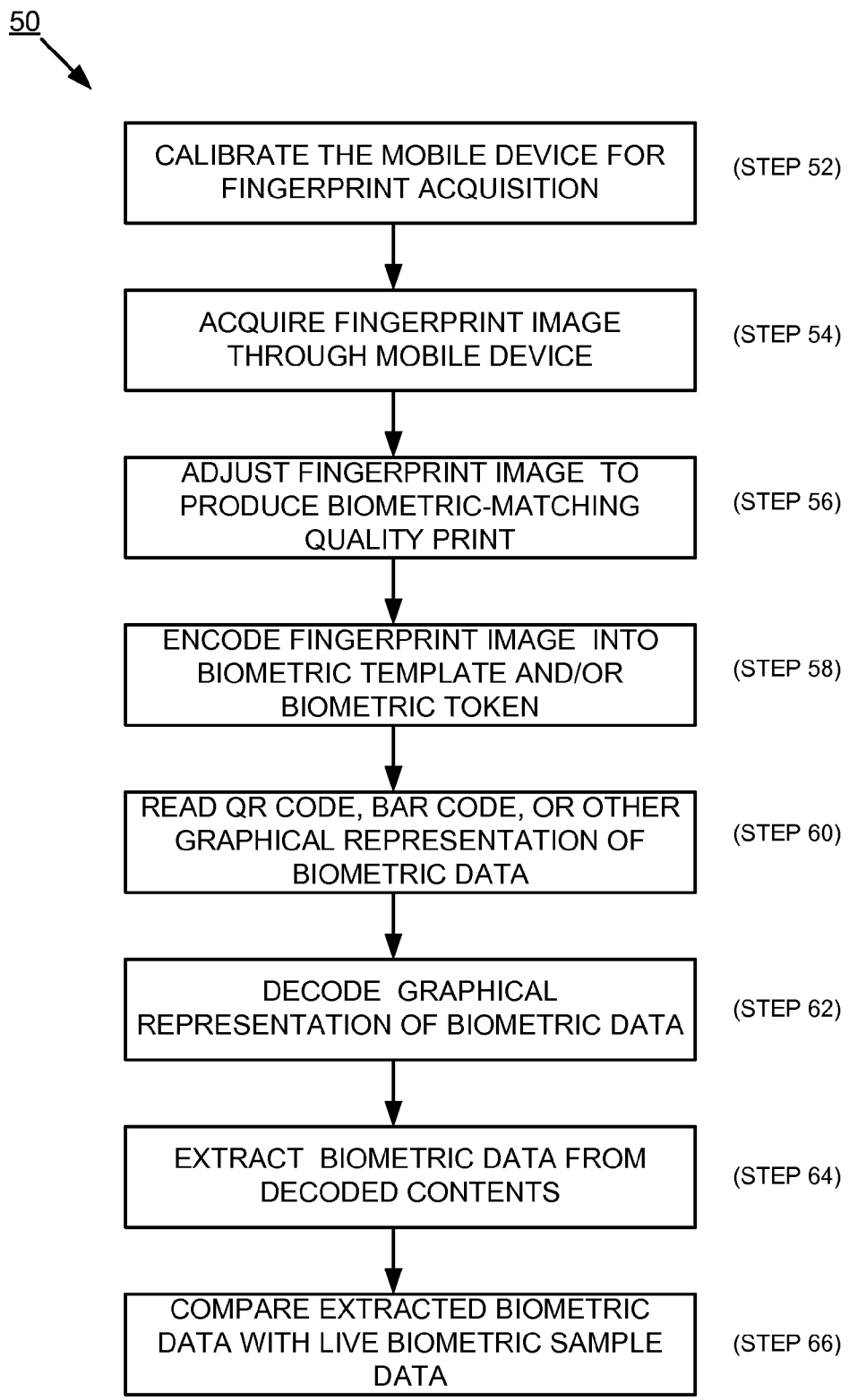
FIG. 2 is a flow chart of an embodiment of a process for automatic and real-time capture, processing, and use of a high-quality dactylographic image in an example biometric matching application.

FIG. 2 shows an embodiment of a process 50 for automatic and real-time capture and generation of a high-quality fingerprint image and use of the fingerprint image in an example biometric matching application. In the description of the process 50, reference is made to elements of FIG. 1. At step 52, the mobile device 14 is calibrated (which, for example, can occur during manufacturing or by the user). The camera 16 of the mobile device 14 acquires (step 54) an image of fingerprint from a finger submitted to the optical module 12. The software system 30 of the mobile device 14 processes (step 56) the acquired fingerprint image using parameters determined during the calibration process, to produce a high-quality fingerprint image suitable for biometric matching.

In one embodiment, at step 54, the camera acquires multiple images of the fingerprint, each image being acquired with one or more different focal properties (e.g., focal length). Small changes in the focal length, for example, bring different features of the fingerprint into focus. Each acquired image corresponds to a "slice" of the fingerprint. An image stacking technique then combines the slices in a manner that selects the features in focus, and produces (step 56) a composite image of the fingerprint.

The high-quality fingerprint image can be subsequently used in enrollment, verification, and/or identification processes. For example, in a verification application, the high-quality fingerprint image is encoded (at step 58) into a minutiae-based biometric template, and, from the biometric template, into a revocable biotoken. The software system 30 applies a biometric template extraction algorithm 44 to extract a biometric template from each acquired live fingerprint image. Such data corresponding to the high-quality fingerprint image is herein referred to as "live biometric sample data." A camera 16 of the mobile device 14 reads in (step 60) an image of a QR code or a bar code or graphical representation (the camera can read the code whether in print form or displayed on a device screen). Software 46 executing on the mobile device 14 decodes (step 62) the contents of the QR code, bar code, or graphical representation and extracts (step 64) biometric data (e.g., a biometric template) from the decoded contents. Biometric matching algorithms 48 then perform (step 66) a comparison between the biometric data extracted from the code and the live biometric sample data (in either the biometric template or revocable biotoken form) in order to verify or authenticate the individual with respect to the QR code, bar code, or graphical representation.

Figure 3:
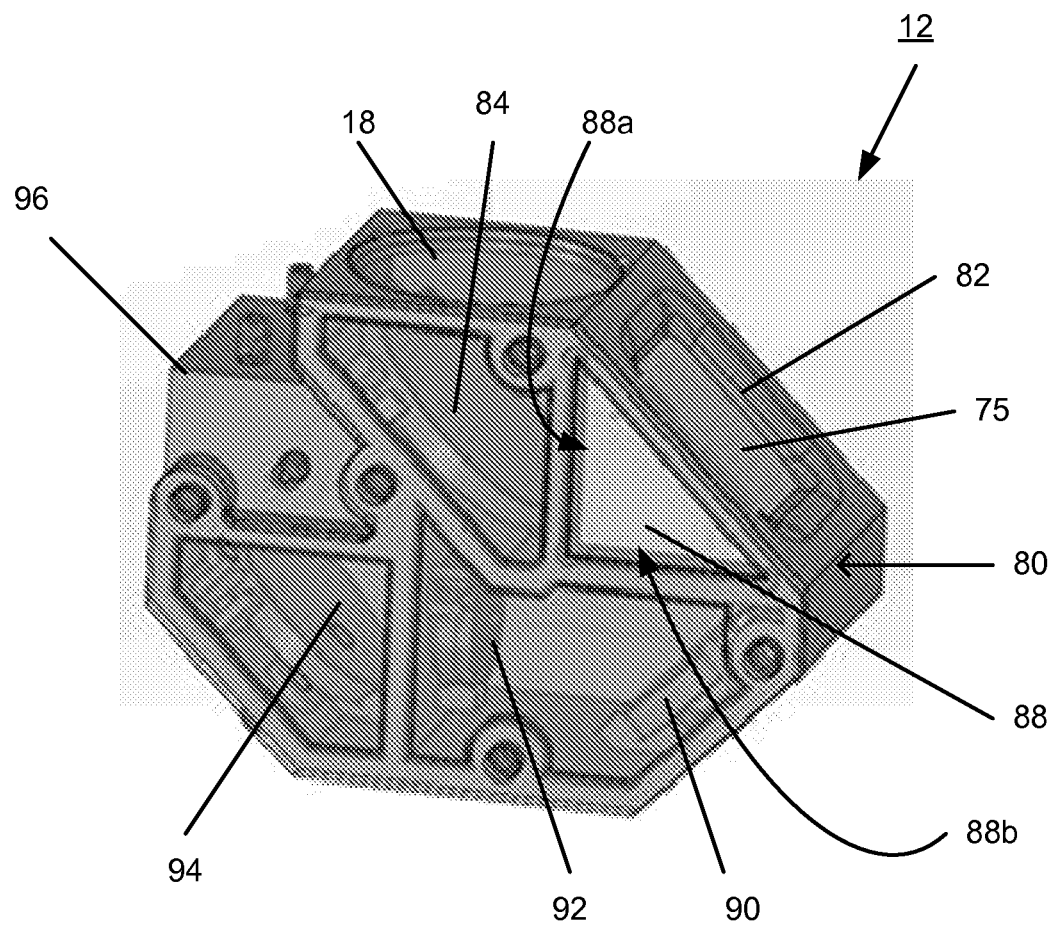
FIG. 3 is a side view of an embodiment of the optical module.

FIG. 3 shows a side view of one embodiment of the optical module 12 that can be used in the acquisition of fingerprints as described herein. The optical module 12 includes a housing 80 with a lighting mechanism 18, also referred to as a diffuser window 18, and a window 82 that frames a transparent surface 70, which, in one embodiment, is one side of a prism. The diffuser window 18 diffuses the ambient light entering the housing 80. In a preferred embodiment, the diffuser window 18 is made of a rigid translucent material, such as glass or plastic. A rigid translucent diffuser window 18 has been found to sufficiently homogenize the ambient light. (Non-homogenous lighting can reduce the quality of captured fingerprint images, because non-uniform lighting can produce false or mask true biometric features, rendering such resulting images problematic for purposes of biometric matching). Another embodiment of the diffuser window 18 comprises a piece of translucent tape.

Instead of the diffuser window 18, other different embodiments can use sources of light other than ambient light, for example, one or more LEDs powered, for example, by one or more solar cells or a small battery. In addition, other embodiments can be adapted to capture fingerprints of multiple fingers simultaneously (e.g., a four-finger slap), using, for example, multiple separate transparent finger surfaces or an enlarged single finger surface. Still other embodiments can have an single transparent surface enlarged to contact skin surfaces for acquiring dactylographic images of palm prints or footprints. The side of the housing 80 is shown to be transparent for purposes of revealing the various components within the housing; the transparency of the side is not a requirement for the proper operation of the optical module 12.

The housing 80 encloses a first mirror (i.e., light reflecting surface) 84, a prism 88, a second mirror (i.e., light reflecting surface) 90, a lens 92, and a third mirror 94. The first mirror 84 is angled within the housing 80 to direct ambient light entering the housing 80 through the diffuser window 18 towards one side 88a of the prism 88. This ambient light serves to illuminate the fingertip of the finger placed on the transparent surface 70 (e.g., the exposed prism surface) framed by the window 82. Light carrying the image of the fingerprint leaves the prism 88 through side 88b. The second mirror 90 is angled within the housing 80 to reflect the image of the fingerprint towards the lens 92. The lens 92 is disposed between the second and third mirrors 90, 94, and focuses the image of the fingerprint from the second mirror 90 onto the third mirror 94. The third mirror 94 is angled within the housing 80 to reflect the image of the fingerprint towards an aperture (e.g., reference numeral 100 in FIG. 5). The attachment mechanism 96 holds the mobile device 14 in place against the optical module 12 when capturing fingerprints.

Figure 4:
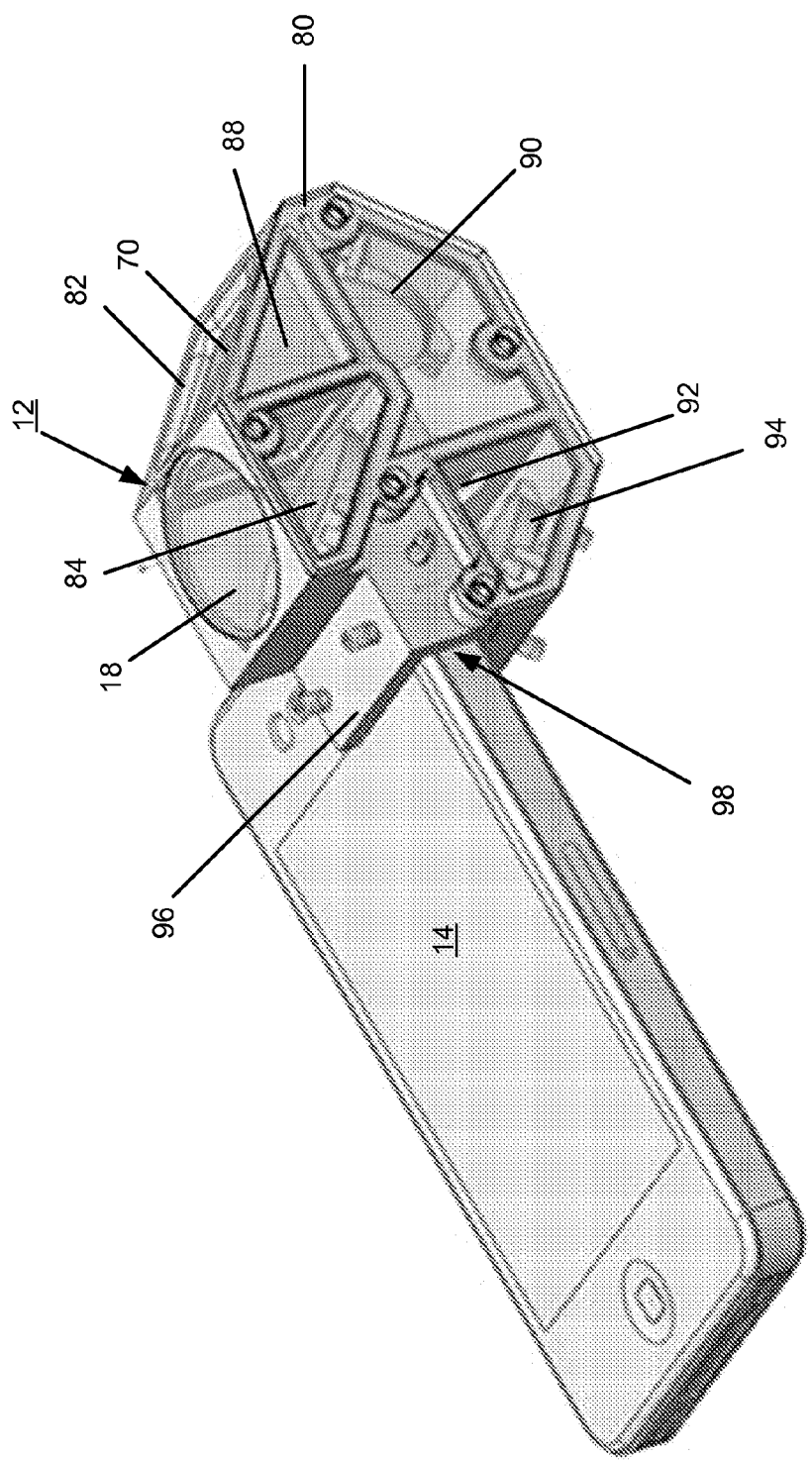
FIG. 4 is an isometric view of the embodiment of the optical module of FIG. 3 coupled to a mobile device.

FIG. 4 shows an example in which the mobile device 14 (with a back-facing camera, and optionally, a front-facing camera) is coupled to the optical module 12 for capturing a fingerprint. The attachment mechanism 96 has a slot 98 adapted to closely receive and hold one end of the mobile phone 14 such that the lens of the back-facing camera of the mobile device aligns with the housing aperture (e.g., reference numeral 100 in FIG. 5) when the mobile phone 14 is coupled to the optical module 12. Rather than directly couple to the mobile device, the attachment mechanism 96 may be designed to attach to a casing that frames and holds the mobile device. Designing the attachment mechanism for attachment to a casing can make the optical module 14 flexible for use with different mobile device models.

Further, another embodiment can have the attachment mechanism 96 movably attached to the mobile device casing so as to remove the optical module 12 from the field of view of the camera aperture on the mobile device 14, for example, on a rail extending left-to-right along the upper back region of the mobile device. Moved in one direction along this rail, the mobile device slides in place over the aperture; moved in the opposite direction, the mobile device slides away from and out of the way of the optical module 12. This movable attachment can facilitate joining the optical module 12 to and removing the optical module 12 from the mobile device 14.

Another embodiment can have the attachment mechanism 96 movably attached to the mobile device casing so as to remove the optical module 12 from the field of view of the camera aperture on the mobile device 14, for example, on a pivotable arm that allows the optical module to twist around an axis that is perpendicular to the back of the mobile device 14. Twisted on this axis, the mobile device turns into place over the aperture; moved in the opposite direction, the mobile device is turned out of the way of the optical module 12. This movable attachment mechanism can facilitate joining the optical module 12 to and removing the optical module 12 from the mobile device 14.

Yet another embodiment can have the attachment mechanism 96 movably attached to the mobile device casing so as to remove the optical module 12 from the field of view of the camera aperture on the mobile device 14, for example, on an axle that allows the optical module twist around an axis that is parallel to the back of the mobile device 14. Twisted on this axis, the mobile device is brought down into place over the aperture; moved in the opposite direction, the mobile device is flipped above the mobile device 14 and out of the way of the optical module 12. This movable attachment mechanism can facilitate joining the optical module 12 to and removing the optical module 12 from the mobile device 14.

Provided the front-facing camera can attain sufficient resolution, other embodiments of the optical module 12 can be adapted to use the front-facing camera instead of the back-facing camera for capturing fingerprints. Alternatively, the front-facing camera can be used simultaneously with the back-facing camera; that is, the front-facing camera can take a photograph of the user's face as an additional biometric, while the back-facing camera captures the user's fingerprint.

Figure 5:
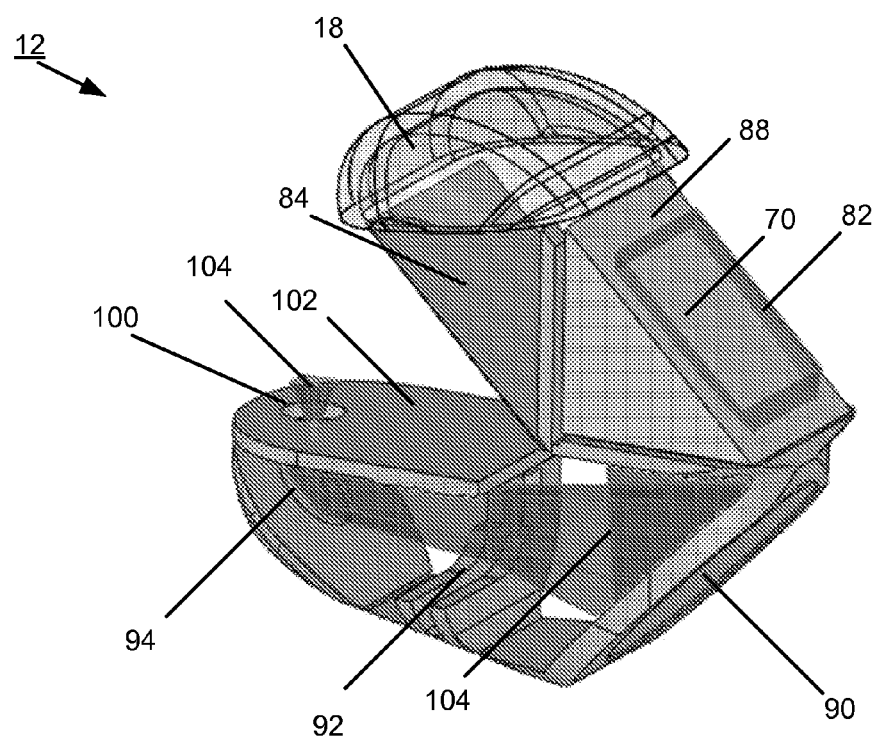
FIG. 5 is a side view of another embodiment of the optical module without the housing and various internal components.

FIG. 5 shows a side view of another embodiment of the optical module 12 that can be used in the acquisition of fingerprints. The housing 80, the first, second and third mirrors 84, 90, and 94, and the lens 92 have been omitted from the drawing to simplify the illustration of the propagation of the fingerprint image through the optical module 12; their corresponding reference numerals being used here to indicate their general locations within the optical module 12. A planar section 102 of the housing frame has an aperture 100 formed therein. The image of the fingerprint of a fingertip pressed on the transparent surface 70 exits through this aperture 100, as illustrated by light path 104.

Figure 6:
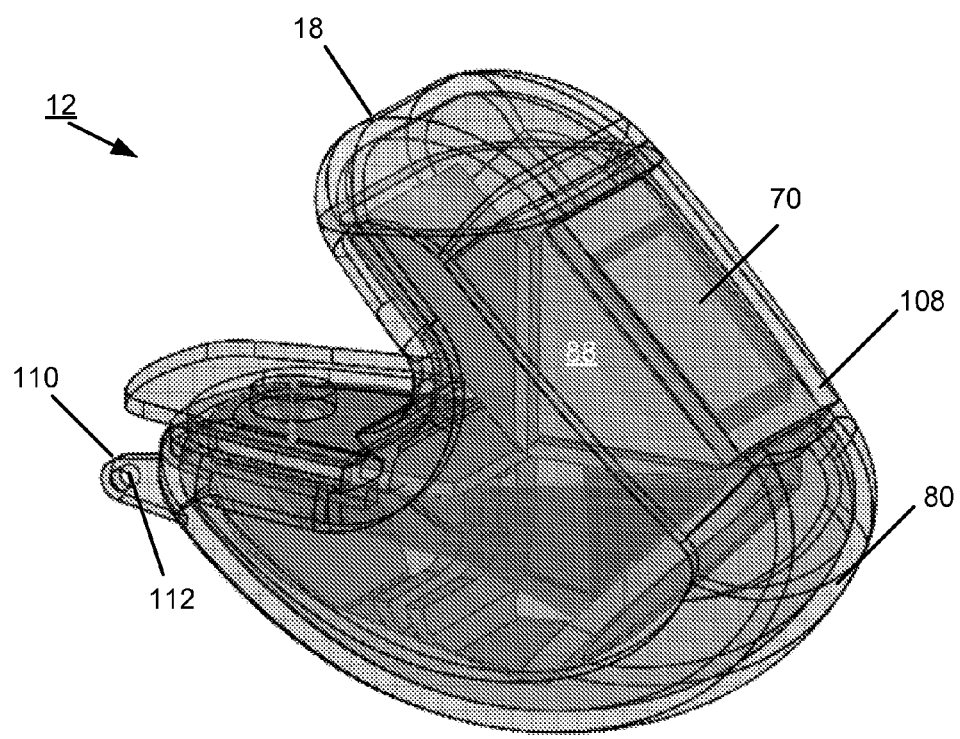
FIG. 6 is a side view of the embodiment of the optical module of FIG. 5 with its housing.

FIG. 6 shows a side view of the embodiment of the optical module 12 of FIG. 5 with its housing 80. The housing 80 is here shown as transparent for purposes of displaying the internal components of the optical module 12. Generally, the housing 80 is opaque, with the translucent diffuser window 18 attached thereto. The housing 80 also has a window 108 that frames the transparent surface 70 of the prism 88, and a pair of brackets 110. Each bracket 110 has an opening 112. The brackets 110 are part of an attachment mechanism for coupling the optical module 12 to a casing made for the mobile device 14.

Figure 7:
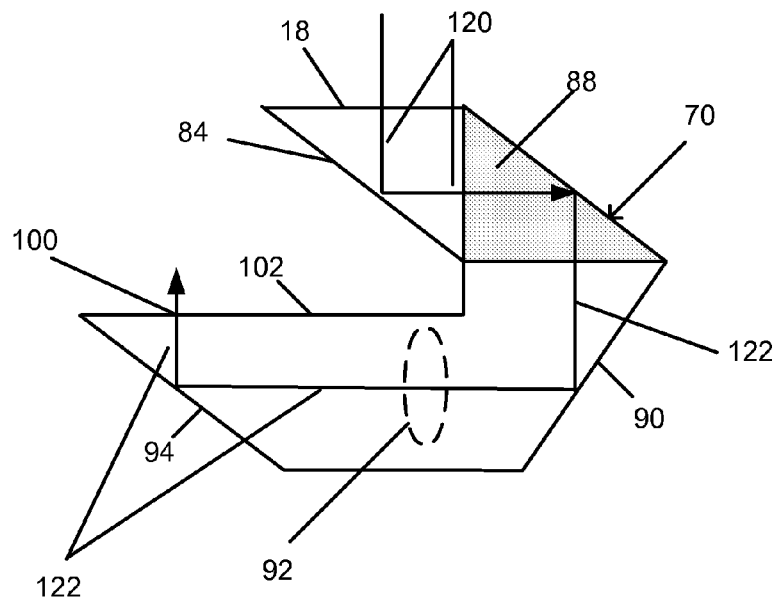
FIG. 7 is a diagram illustrating paths taken generally by light passing through the optical modules of FIG. 3 and FIG. 5.

FIG. 7 shows schematically the paths generally taken by light passing through the optical modules of FIG. 3 and FIG. 5. Ambient light, represented by arrow 120, enters the housing 80 through the diffuser window 18 and reflects off the first mirror 84 into the prism 88 and onto the interior side of the transparent surface 70, where it illuminates a fingertip placed on the exterior side of the transparent surface 70. Light carrying the image of the fingerprint, represented by the arrow 122, bends through the prism 88 towards the second mirror 90, which reflects the fingerprint image through the lens 92. The lens 92 focuses the fingerprint image onto the third mirror 94, which reflects the fingerprint image into the aperture 100 (formed in the planar portion 102 of the housing frame).

Figure 8:
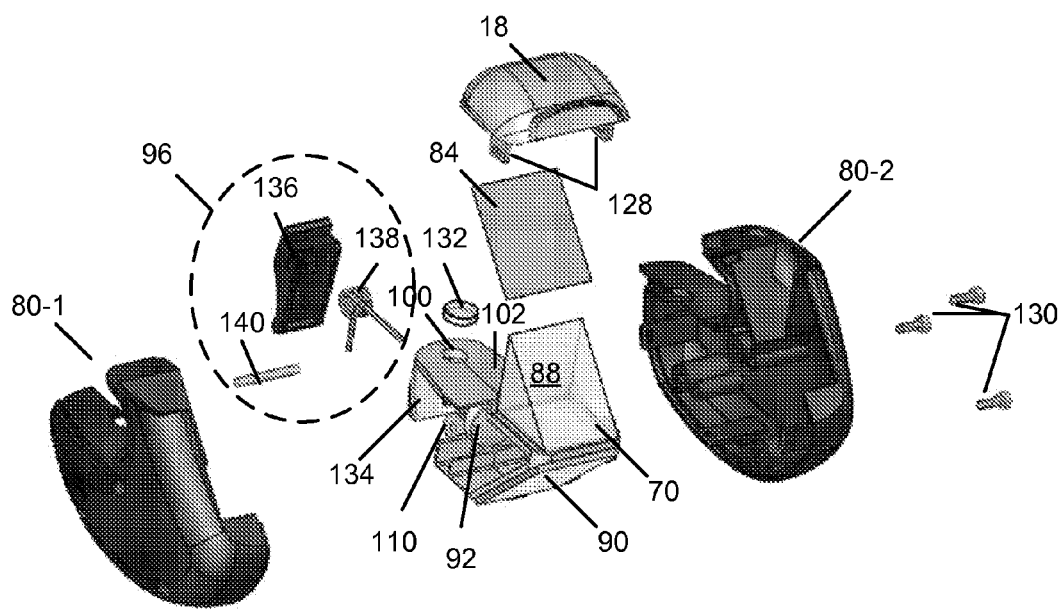
FIG. 8 is an exploded view of the optical module of FIG. 5.

FIG. 8 shows an exploded view of the embodiment of optical module 12 of FIG. 5, including two housing halves 80-1, 80-2 that form the housing 80 when joined together, and fasteners 130 for joining the halves 80-1, 80-2 together. The diffuser window 18 has tabs 128 that couple to the housing halves. The joined halves form an opening that aligns with the aperture 100 of the planar portion 102 of the housing frame. This opening closely receives a transparent exit window 132 made of glass or hardened clear plastic.

The mirror 84 is a diffuse mirror, and mirrors 90, 94 are fold mirrors. In one embodiment, the mirrors 84, 90 are rectangular in shape; the mirror 94 is disc-shaped and fits in an opening (not visible) in a sloped panel 134 of the housing frame, this opening being sized to closely receive the mirror 94. This embodiment of attachment mechanism 96 includes a spring latch 136, a torsion spring 138, and a latch axle 140. When the attachment mechanism 96 is assembled, the latch axle 140 passes through openings in the spring latch 136, the torsion spring 138, and the brackets 110 of the housing frame.

Figures 12, 13:
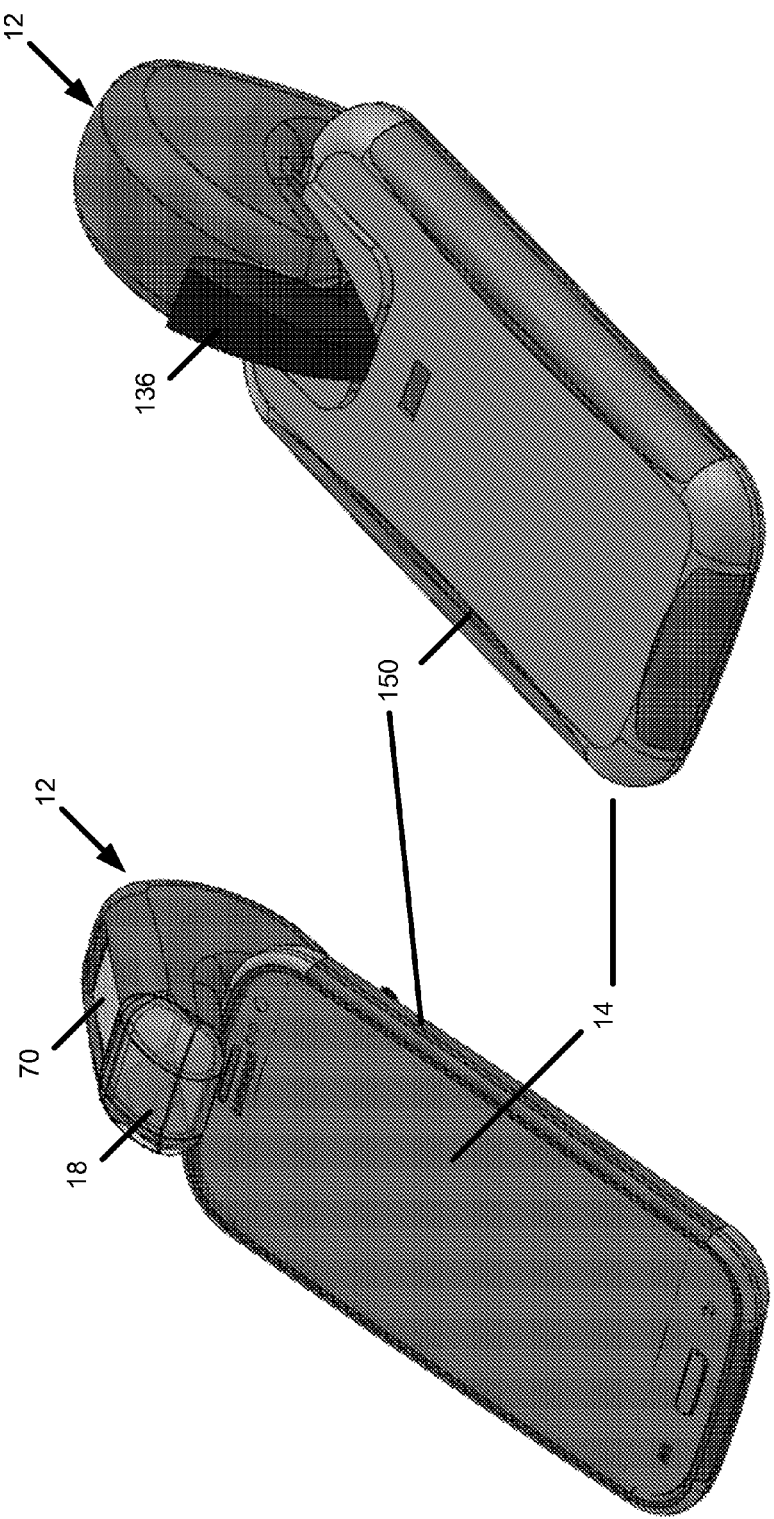
FIG. 12 is a top view of the optical module of FIG. 5 coupled to a mobile device.
FIG. 13 is a bottom view of the optical module of the FIG. 5 coupled to the mobile device.

FIG. 9 shows a top view, FIG. 10, a side view, and FIG. 11, an isometric front view of the optical module of FIG. 5. The isometric view in FIG. 11 shows the spring-loaded latch 136, which is absent in FIG. 9 and FIG. 10 (i.e., the brackets 110 are unattached). FIG. 12 shows a top view of the optical module 12 coupled to a mobile device 14. With the optical module 12 coupled to a mobile device 14, the diffuser window 18 and mirror 84 do not impede view of the display of the mobile device 14. FIG. 13 shows a bottom view of the optical module 12 coupled to the mobile device 14, wherein the optical module slides into rails of the mobile device casing 150 and locks in place with the spring-loaded latch 136.

Figure 14:
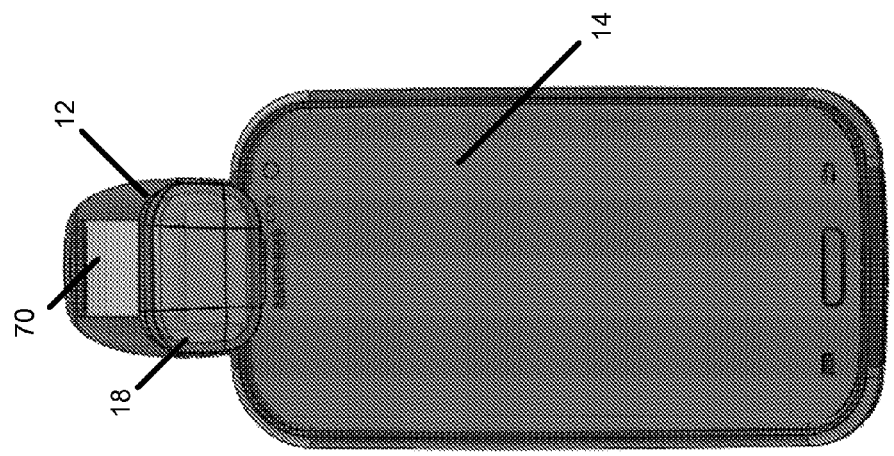
FIG. 14 is a top view of the optical module of FIG. 5 coupled to a mobile device from the perspective of the individual administering the fingerprinting.

FIG. 14 shows a top view of the optical module of FIG. 5 coupled to a mobile device 14 from the perspective of an individual administering the fingerprinting, with the mobile device 14 being proximal and the optical module 12 being distal with respect to the administrator. In this orientation, the display of the mobile device 14 is visible to the administrator, who can view the captured fingerprint image and any biometric comparison results in real time.

Figure 15:
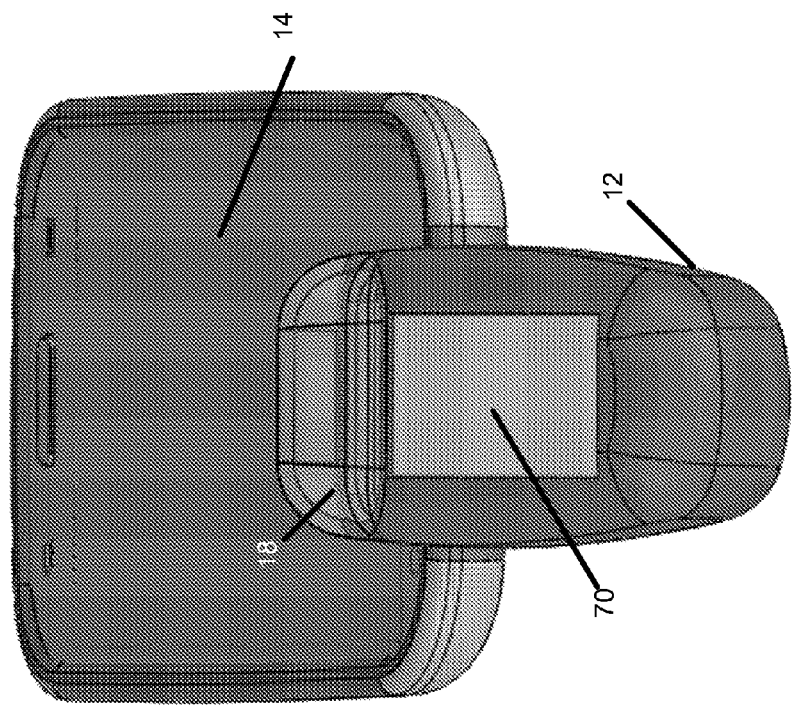
FIG. 15 is a bottom view of the optical module of the FIG. 5 coupled to the mobile device from the perspective of the individual being fingerprinted.

FIG. 15 is a bottom view of the optical module of the FIG. 5 coupled to the mobile device from the perspective of the individual being fingerprinted, with the optical module 12 being proximal and the mobile device 14 being distal with respect to the individual being fingerprinted. In this orientation, the transparent surface 70 faces the one being fingerprinted.

It is to be understood that the principles described herein extend to various other shapes of optical modules, with one, two, or more light reflecting surfaces for defining the path taken by the light passing through the optical module housing. For example, FIG. 16A shows a top view of another embodiment of an optical module 12 used in the acquisition of fingerprints as described herein. Like the optical modules described in connection with FIG. 3 and FIG. 5, the optical module 12 is designed for detachable attachment to any of a variety of mobile devices having one or more native cameras. In this embodiment, the optical module 12 is a passive device, using ambient lighting through a diffuser window 178 (FIG. 16D) to illuminate a skin surface placed on the transparent surface 170 during the dactylographic image capture process. This transparent surface 170 can be an exposed side of the prism 188 (FIG. 16B) within the housing 180, or a pane (e.g., glass) that abuts that side of the prism 188. Alternatively, illumination of the display of the mobile device 14 can be modulated to provide a uniform illumination for the image acquisition. Shown in phantom in FIG. 16A, to signify components within the housing 180, the optical module 12 comprises a prism lens 160 and a plurality of light reflecting surfaces or mirrors 162-1, 162-2. The lens 160 may be an integral part of the construction of the prism 188.

FIG. 16B shows a side view of the optical module 12 of FIG. 16A. From this side view perspective, the housing 180 is generally L-shaped with a window 182 at the sloped end of the housing. A right-angle prism 188 resides at the sloped end, with the hypotenuse side 164a of the prism 188 being exposed within the window 182 to serve as the transparent surface 170 or, if the window 182 has a pane, abutting a transparent surface of the pane. The lens 160 extends from another side 164b of the prism 188. A third side 164c of the prism 188 abuts the bottom the housing 180.

The mirrors 162-1, 162-2 are arranged to reverse the direction of the light as illustrated by arrow 168; the mirror 162-1 being directly opposite the lens 160 and fixed at a 45-degree angle within the housing 180 in order to reflect light coming through the lens 160, which carries the image of a fingerprint, towards the mirror 162-2. The mirror 162-2 is at a 90-degree angle with respect to the mirror 162-1 in order to complete the 180-degree reflection. The particular placement of the mirrors 162-1, 162-2 is configurable within each housing design and determined by the relative physical location of the camera lens of the mobile device 14. The mirrors 162-1, 162-2 are disposed at preconfigured distances from the lens 160, such distances from the lens 160 varying for different embodiments of the optical module 12, depending upon the model (type) of mobile device 14 with which the optical module 12 is designed for use. The fingerprint image exits the optical module 12 through an aperture 166 (FIG. 16C) in a side 172 of the housing 180. When positioned to capture fingerprint images, a mobile device 14 abuts this side 172 of the housing 180, with the camera lens of the mobile device aligned with the aperture 166. An attachment mechanism holds the mobile device 14 securely in place during the photographing of the fingerprint.

FIG. 16C shows the housing 180 from the sloped end with the transparent surface 170. This end view shows the aperture 166 below the transparent surface 170 (although, they are on different planes of the optical module 12). The mirror 162-2 reflects light out through this aperture 166.

FIG. 16D shows a bottom view of the housing 180, with a diffuser window 178 at the sloped end of the housing 180, for purposes of diffusing the incoming ambient light. In a preferred embodiment, the diffuser window 178 is made of a rigid translucent material, such as glass or plastic. In another embodiment, the diffuser window 178 is a piece of translucent tape placed over an opening in the housing at the third side 166c (FIG. 16B) of the prism 188. Other embodiments of the diffuser window 178 can be fully transparent.

Figure 16E:
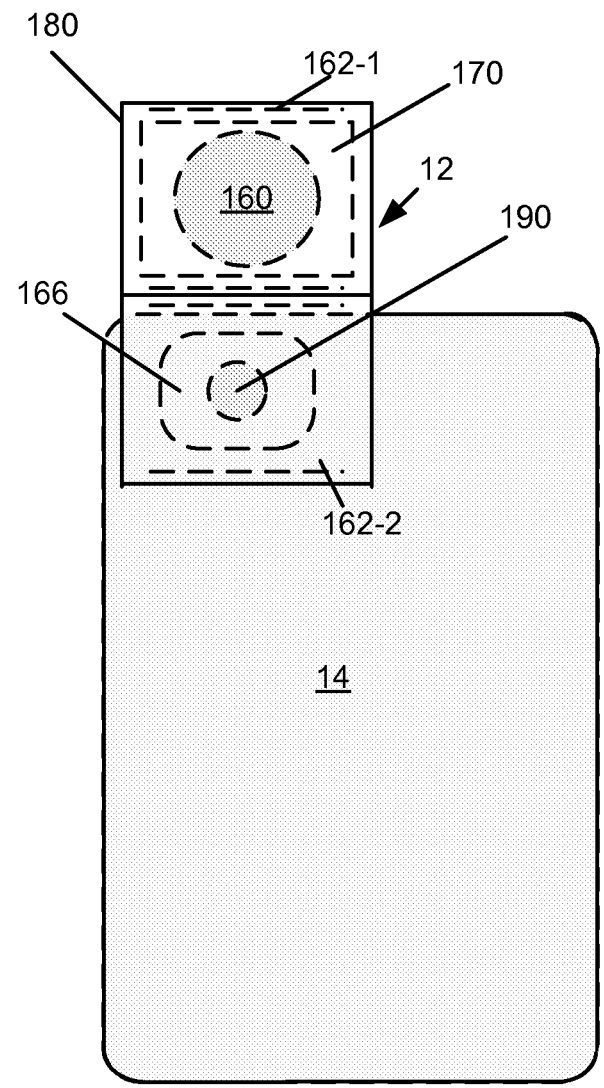
FIG. 16E is a diagram showing a mobile device, having a native camera, coupled to one side of the optical module of 16A.

FIG. 16E shows an end view (opposite the sloped end) of a mobile device 14 with a native camera coupled to one side of the housing 180. A back-facing camera lens 190 of the mobile device 14 aligns with the aperture 166 opposite the mirror 162-2, which is within the housing 180. In this position, the front-side display of the mobile device 14 faces in the general direction of the diffuser window 178 and can thus be a source of light during image acquisition. Control of the illumination of the display during image acquisition may produce a more uniform illumination than ambient light alone.

To acquire a fingerprint, a subject presses his or her finger against the transparent surface framed by the window 182 at the sloped end of the housing. Ambient light enters the third side 164c of the prism 188 through the diffuser window 178 and illuminates the fingertip. The lens 160 of the prism 188 focuses the image of the fingerprint onto the mirror 162-1, the mirror 162-1 reflects the light onto the mirror 162-2, and the mirror 162-2 reflects the fingerprint image into the camera lens 190. The camera system native to the mobile device 14 captures and saves the fingerprint image. The software system 30 (FIG. 1) running on the mobile device 14 can subsequently process the fingerprint image to produce a high-quality image suitable for biometric matching.

Figure 17A:
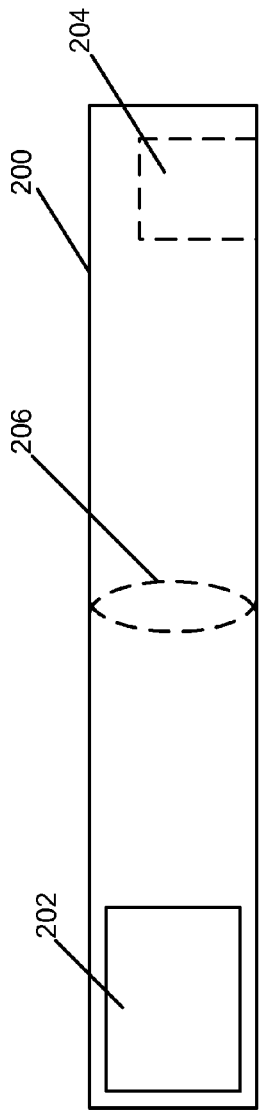
FIG. 17A is a diagram of a top view of another embodiment of an optical module housing having a prism at one end, an interior lens, and a mobile device attachment mechanism at the opposite end.

FIG. 17A shows a top view of another example of a different design for a housing 200 of an optical module 12. At one end of the housing 200 is a right-angle prism 202. At the end opposite the prism 202 is an attachment mechanism 204 for holding a mobile device 14. Disposed within the housing 200, between the prism 202 and the attachment mechanism 204, is a lens 206.

Figure 17B:
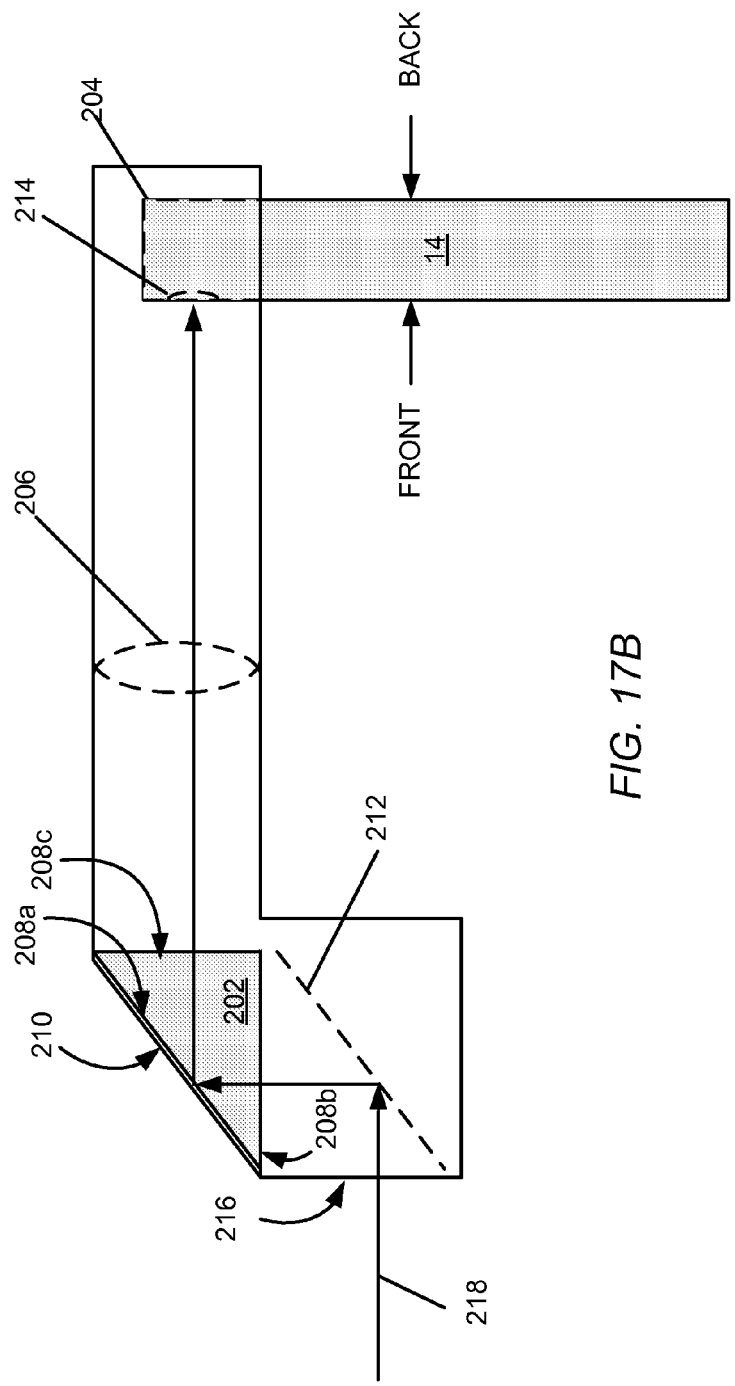
FIG. 17B is a diagram of a side view of the optical module housing with an interior mirror for directing ambient light into the prism.

FIG. 17B shows a side view of the housing 200. A first side 208a of the prism 202 abuts a window 210 with a pane that provides a surface for the placement of one or more fingers. Alternately, the window 210 can be open (i.e., a frame without a pane), and the first side 208a of the prism 202 serves as a transparent surface for placement of the finger(s). The housing 200 further includes an interior light reflecting surface (e.g., a diffuse mirror) 212 for reflecting light into another side 208b of the prism 202. The attachment mechanism 204 holds a mobile device 14 such that the lens 214 of a front-facing camera of the mobile device 14 faces the prism 202. (The mobile device 14 may be held in a casing designed specifically to fit closely in and couple to the attachment mechanism 204). The camera lens 214 aligns with an aperture (not shown) in the housing.

Ambient light enters the housing 200 through a translucent or transparent diffuser window 216 (see also FIG. 17C), generally following path 218, reflecting off the light reflecting surface 212, passing into the prism 202 through side 208b, and illuminating the one or more fingers placed on the transparent surface framed by window 210. The image of the fingerprint(s) exits the prism 202 through its third side 208c and passes through the lens 206. The lens 206 focuses the fingerprint image at the aperture, behind which is disposed the lens 214 of the front-facing camera of the mobile device 14. In accordance with the principles described herein, the camera of the mobile device takes a snapshot of the fingerprint, and software running on the mobile device processes the image to produce a matching quality image.

Figure 17C:
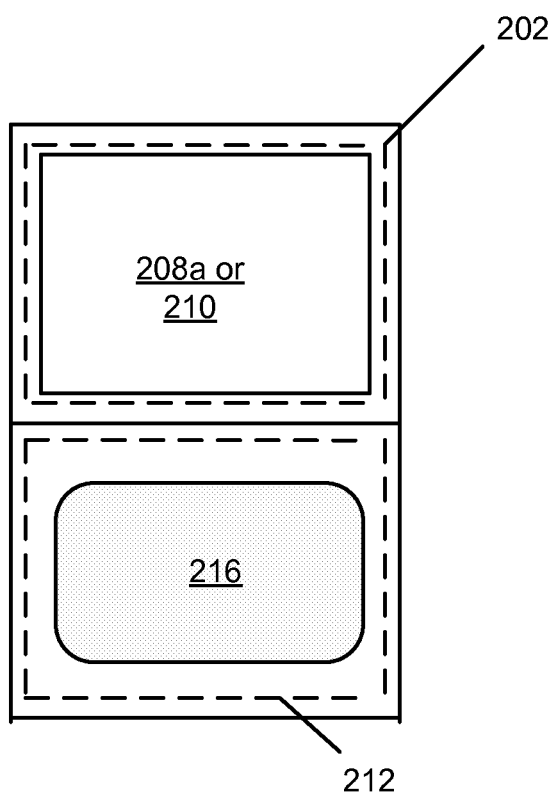
FIG. 17C is a diagram of an end view of the optical module housing with a diffuser window adjacent to a window that frames a transparent surface used for making contact with a skin surface of the user.

FIG. 17C shows an end view of the housing 200 with the diffuser window 216 adjacent to (or, in the figure, below) the transparent surface (i.e., window 210 or prism surface 208a).

Figure 18A:
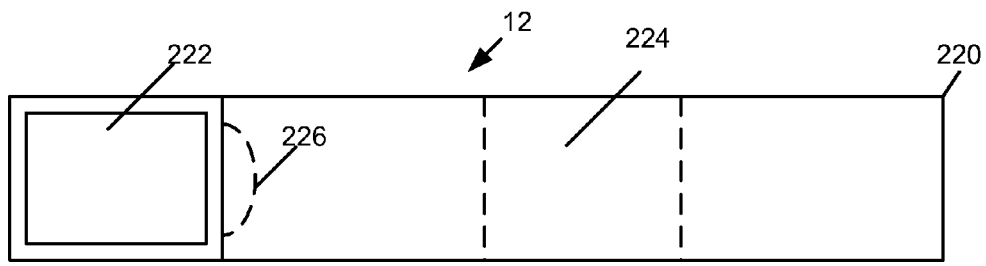
FIG. 18A is a diagram of a top view of another embodiment of an optical module.

FIG. 18A shows a top view of still another example of a different design for a housing 220 of an optical module 12. The housing 220 includes a transparent surface 222 (e.g., glass) at one end of the housing. Within the housing 220 is a mirror 224 at a preconfigured distance from a lens 226. This distance varies for different embodiments of the optical module 12, depending upon the model (type) of mobile device with which the optical module is designed for use. The particular placement of the mirror 224 can be configured appropriately within the housing to suit the type of mobile device and its relative physical location of the camera lens.

Figure 18B:
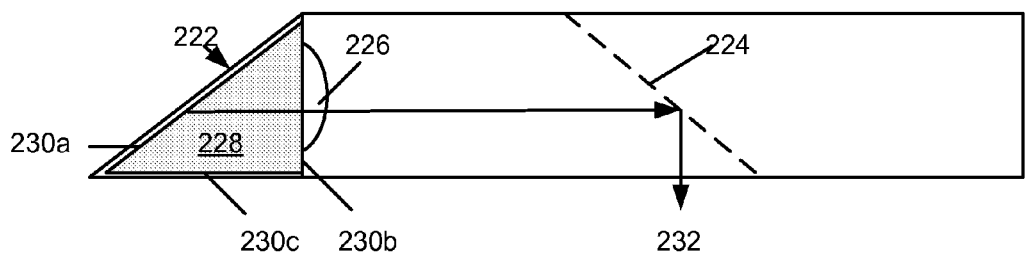
FIG. 18B is a diagram of a side view of the housing of the optical module of FIG. 18A.

FIG. 18B shows a side view of the housing 220, wherein the end with the transparent surface 222 is sloped in shape. The housing 220 encloses a prism 228 disposed at the sloped end. One side 230a of the prism 228 can serve as the transparent surface 222. (Alternatively, the transparent surface 222 can be a pane that abuts this side 230a of the prism 228). The lens 226 is disposed at another side 230b of the prism 228 (the lens 226 may be an integral part of the construction of the prism 228). The mirror 224 is fixed at a 45-degree angle within the housing 220 in order to reflect light coming through the lens 226 to one side of the housing, as illustrated by arrow 232. A third side 230c of the prism 228 abuts the bottom the housing 220. Where the third side 230c abuts, the housing 220 can have an open window so that the third side 230c is directly exposed to ambient light. This open window is covered by a diffuser 234 (FIG. 18E).

Figure 18C:
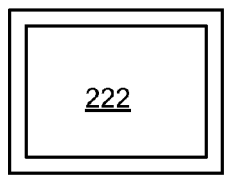
FIG. 18C is a diagram of the housing viewed from the sloped end having a window that frames a transparent surface used for making contact with a skin surface of the user.
Figure 18D:
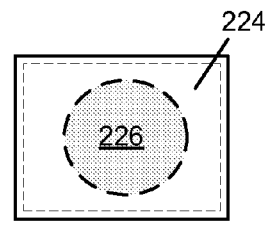
FIG. 18D is a diagram of the housing viewed from the end opposite the sloped end, the housing having an interior mirror and lens appearing in phantom.

FIG. 18C shows the housing 220 from the sloped end having the transparent surface 222; FIG. 18D shows the housing 220 from the end opposite the sloped end, with the mirror 224 and lens 226 appearing in phantom.

Figure 18E:
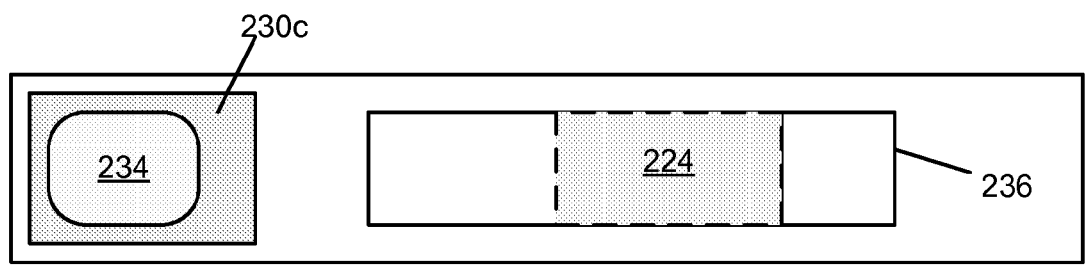
FIG. 18E is a diagram of a bottom view of the housing, with a diffuser window at the sloped end of the housing.

FIG. 18E shows a bottom view of the housing 220, with a diffuser window 234 at the sloped end of the housing 220. The diffuser window 234 can be made of a translucent tape placed over an open window in the bottom of the housing and covering the exposed side 230c of the prism 228. The housing 220 also has an elongated aperture 236 behind which the mirror 224 is visible.

Figure 18F:
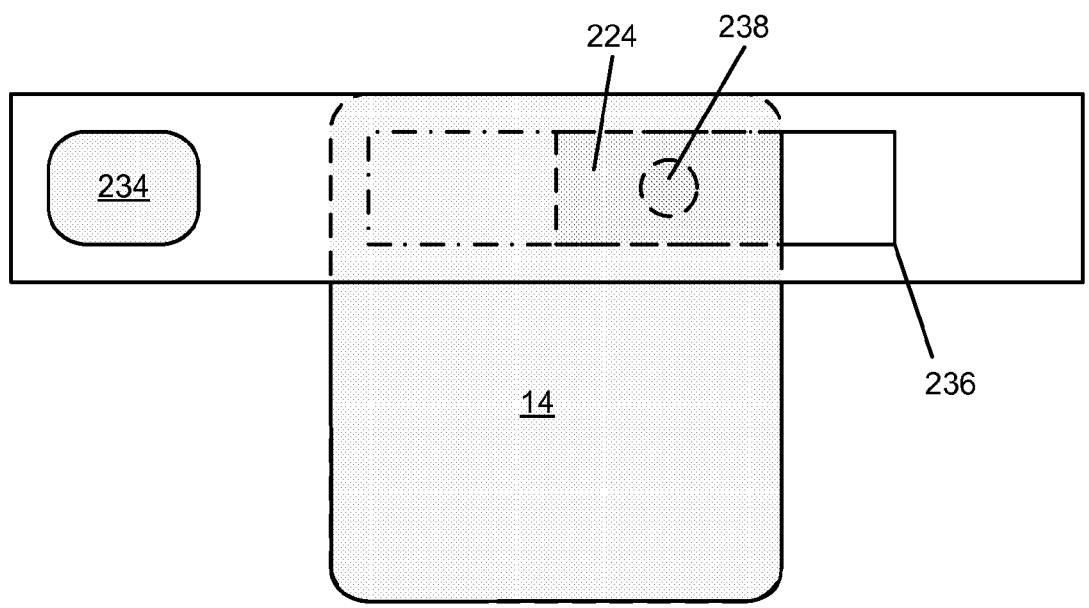
FIG. 18F is a diagram of a mobile device, having a native camera, coupled to the bottom side of the housing.

FIG. 18F shows a mobile device 14 with a camera coupled to the bottom side of the housing 220. The lens 238 of the mobile device's camera aligns opposite the mirror 224 within the housing 220 to receive the image of the fingerprint. To acquire a fingerprint, a subject presses his or her fingertip against the transparent surface 222 at the sloped end of the housing 220. Ambient light enters the third side 230c of the prism 228 through the diffuser window 234 and illuminates the fingertip. The lens 226 of the prism 228 directs the image of the fingerprint onto the mirror 224, and the mirror 224 reflects the fingerprint image into the camera lens 238. The arrangement is analogous to a simple periscope design, utilizing a lens and mirror to project the image onto a plane other than that of the camera lens 238. The camera system, native to the mobile device 14, captures and saves the fingerprint image. In another embodiment, a powered light source (e.g., a flash or display screen of the camera, an LED) is used to illuminate the fingertip pressed on the transparent surface 222 at the sloped end of the housing.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

In addition, the described methods can be implemented on an image processing device, fingerprint processing device, or the like, or on a separate programmed general purpose computer having image processing capabilities. Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the image processing system according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

It is, therefore, apparent that there has been provided, in accordance with the present invention, methods for capturing and processing fingerprint images to produce high-quality fingerprints suitable for biometric matching applications. While this invention has been described in conjunction with a number of embodiments, it is evident that many alternatives, modifications and variations would be or are apparent to those of ordinary skill in the applicable arts. For example, an optical module can be adapted to capture fingerprints without the use of mirrors; for example, an elongated tube or rectangular housing with the prism at one end of the housing and the mobile phone with the camera at the opposite end of the housing. Accordingly, it is intended to embrace all such alternatives, modifications, equivalents, and variations that are within the spirit and scope of this invention.

Relative terms used herein, such as top, bottom, front, back, side, left, right, above, below, upper, and lower, refer to how features of the apparatus appear in the figures, and serve to facilitate the description of the invention, and are not meant to be interpreted as limitations.

What is claimed is:

1. A non-powered optical module configured to acquire a dactylographic image for a mobile device with a built-in camera comprising:
   an attachment mechanism that holds the optical module on the mobile device;
   a housing having a side with an aperture formed therein, and a window framing a transparent surface that contacts a skin surface of a person;
   a lighting mechanism that provides light to illuminate the skin surface of the person placed upon the transparent surface;
   a prism having:
      a first side facing the lighting mechanism,
      a second side facing the window that frames the transparent surface to contact the skin surface of the person, and
      a third side through which a dactylographic image of the skin surface of the person exits the prism; and
   a plurality of light reflecting surfaces within the housing spatially separated from the prism, the plurality of light reflecting surfaces disposed within the housing to reflect the dactylographic image of the skin surface of the person exiting the prism towards the aperture in the side of the housing toward the camera in the mobile device.

2. The optical module of claim 1, wherein the skin surface of the person that contacts the transparent surface comprises one or more fingertips, and the dactylographic image of the skin surface of the person comprises a fingerprint image.

3. The optical module of claim 1, wherein the lighting mechanism comprises a diffuser window that diffuses light entering therethrough.

4. The optical module of claim 3, wherein the plurality of light reflecting surfaces include a mirror disposed within the housing to reflect light entering the diffuser window towards the first side of the prism.

5. The optical module of claim 1, further comprising a lens disposed in a light path between the prism and one of the reflecting surfaces to focus the dactylographic image.

6. The optical module of claim 1, wherein the plurality of light reflecting surfaces includes first and second mirrors, the first mirror being disposed within the housing to reflect the dactylographic image towards the second mirror, and the second mirror being disposed within the housing to reflect the dactylographic image reflected from the first mirror towards the aperture in the side of the housing.

7. The optical module of claim 6, further comprising a lens disposed in a light path between the first and second mirrors to focus the dactylographic image reflected from the first mirror onto the second mirror.

8. The optical module of claim 7, wherein the second mirror is disposed within the housing to reflect the dactylographic image into the aperture in the side of the housing.

9. The optical module of claim 1, wherein the attachment mechanism further comprises a frame that couples detachably to the mobile device with the camera such that a lens of the camera of the mobile device aligns with the aperture in the side of the housing.

10. The optical module of claim 1, wherein the lighting mechanism comprises forwards light toward the camera in the mobile device via a diffuser window.

11. The optical module of claim 1, wherein the mobile device is one of a smart phone, a tablet and a media player.

12. A method for acquiring a dactylographic image comprising:
   acquiring, by a camera of a mobile device, a dactylographic image of a skin surface of a person from an optical module, the optical module including:
      an attachment mechanism that holds the optical module on the mobile device;
      a housing having a side with an aperture formed therein, and a window framing a transparent surface that contacts a skin surface of a person;
      a lighting mechanism that provides light to illuminate the skin surface of the person placed upon transparent surface;
      a prism having:
         a first side facing the lighting mechanism,
         a second side facing the window that frames the transparent surface to contact the skin surface of the person, and
         a third side through which a dactylographic image of the skin surface of the person exits the prism; and
      a plurality of light reflecting surfaces within the housing spatially separated from the prism, the plurality of light reflecting surfaces disposed within the housing to reflect the dactylographic image of the skin surface of the person exiting the prism towards the aperture in the side of the housing toward a camera in the mobile device; and adjusting, by the mobile device, the acquired dactylographic image to produce a dactylographic image of a quality suitable for biometric matching.

13. The method of claim 12, wherein the skin surface of the person comprises one or more fingertips, and the dactylographic image of a quality suitable for biometric matching comprises a fingerprint image.

14. The method of claim 12, wherein the adjusting the acquired dactylographic image includes compensating for distortions caused by perspective, magnification, and camera barrel distortion.

15. The method of claim 12, wherein the adjusting the acquired dactylographic image includes normalizing illumination to correct for non-homogeneous lighting.

16. The method of claim 12, further comprising:
acquiring one or more additional dactylographic images of the skin surface of the person;
adjusting each additional dactylographic image; and
merging the additional adjusted dactylographic images to produce the dactylographic image of a quality suitable for biometric matching.

17. The method of claim 12, wherein the dactylographic image of a quality suitable for biometric matching has a resolution of 500 to 1000 ppi.

18. The method of claim 12, wherein the dactylographic image of a quality suitable for biometric matching is monochromatic.

19. The method of claim 12, further comprising calibrating the mobile device to prepare the mobile device for producing dactylographic images of a quality suitable for biometric matching from acquired fingerprint images.

20. The method of claim 12, wherein the adjusting the acquired dactylographic image includes accounting for image reproduction variance associated with the mobile device.

21. The method of claim 12, further comprising encoding the dactylographic image of a quality suitable for biometric matching into live biometric sample data.

22. The method of claim 21, wherein the live biometric sample data includes a revocable biometric token.

23. The method of claim 21, wherein the live biometric sample data includes a minutiae-based biometric template.

24. The method of claim 21, further comprising performing a biometric comparison between the live biometric sample data and data corresponding to at least one reference biometric sample.

25. The method of claim 24, further comprising storing the data corresponding to the at least one reference biometric sample on the mobile device, and wherein the mobile device performs the biometric comparison.

26. The method of claim 24, further comprising storing the data corresponding to the at least one reference biometric sample on a computer system external to the mobile device.

27. The method of claim 26, further comprising retrieving, by the mobile device, the data corresponding to the at least one reference biometric sample from the computer system, wherein the mobile device performs the biometric comparison.

28. The method of claim 26, further comprising transmitting, by the mobile device, the live biometric sample data to the computer system, and wherein the computer system performs the biometric comparison.

29. The method of claim 24, further comprising:
encoding the data corresponding to the at least one reference biometric sample into a code;
acquiring, by the camera of the mobile device, an image of the code; and
decoding, by the mobile device, the code to acquire the data corresponding to the at least one reference biometric sample, wherein the mobile device performs the biometric comparison.

30. The method of claim 24, further comprising:
encoding the data corresponding to the at least one reference biometric sample on a chip; and
communicating, by the mobile device, with the chip to retrieve the data corresponding to the at least one reference biometric sample from the chip, and wherein the mobile device performs to biometric comparison.

31. The method of claim 24, further comprising identifying, in response to the biometric comparison, one or more reference biometric samples of the at least one reference biometric sample, as a candidate match to the acquired dactylographic image.

32. The method of claim 24, further comprising verifying a similarity between the live biometric sample data and the data corresponding to at least one reference biometric sample.

33. The method of claim 12, further comprising enrolling the dactylographic image of a quality suitable for biometric matching in a database.

34. The method of claim 12, wherein acquiring, by the camera of the mobile device, dactylographic image of a skin surface of a person includes acquiring multiple dactylographic images of the skin surface of the person, each of the multiple dactylographic images being acquired with one or more different focal properties; and further comprising combining the multiple dactylographic images to produce a composite dactylographic image of the skin surface of the person.

35. The method of claim 12, further comprising automatically downloading a calibration configuration file from a web service for loading onto the mobile device during setup.

36. The method of claim 12, further comprising providing a calibration configuration file on the mobile device to be loaded for use on the mobile device during setup.

37. The method of claim 12, wherein the optical module further comprises a power source to supply power to the lighting mechanism.

38. The method of claim 37, wherein the power source comprises one or more solar cells.

39. A mobile dactylographic image acquisition device comprising:
a camera;
a memory storing program code that, when executed, processes images of skin surfaces of people acquired by the camera;
an attachment mechanism that holds a non-powered optical module to the camera, the optical module comprising:
a housing having a side with an aperture formed therein, and a window framing a transparent surface that contacts a skin surface of a person;
a lighting mechanism that provides light to illuminate the skin surface of the person placed upon the transparent surface;
a prism having:
a first side facing the lighting mechanism,
a second side facing the window that frames the transparent surface to contact the skin surface of the person, and a third side through which a dactylographic image of the skin surface of the person exits the prism; and plurality of light reflecting surfaces within the housing spatially separated from the prism, the plurality of light reflecting surfaces disposed within the housing to reflect the dactylographic image of the skin surface of the person exiting the prism towards the aperture in the side of the housing toward the camera; and a processor configured to execute program code stored in the memory in response to the camera acquiring a dactylographic image of a skin surface of a person, the processor, in response to executing the program code, adjusting the acquired dactylographic image of the skin surface of the person to produce a dactylographic image of a quality suitable for biometric matching.

40. The mobile device of claim 39, wherein the skin surface of the person comprises one or more fingers, and the dactylographic image comprises a fingerprint image.

41. The mobile device of claim 39, wherein the processor, in response to executing the program code, adjusts the acquired dactylographic image by compensating for distortions caused by perspective, magnification, and camera barrel distortion.

42. The mobile device of claim 39, wherein the processor, in response to executing the program code, adjusts the acquired dactylographic image by normalizing illumination to correct for non-homogeneous lighting.

43. The mobile device of claim 39, wherein the processor, in response to executing the program code, produces one or more additional dactylographic images of the skin surface of the person, adjusts each additional dactylographic image, and merges the additional dactylographic images to produce the dactylographic image of a quality suitable for biometric matching.

44. The mobile device of claim 39, wherein the processor, in response to executing the program code, adjusts the acquired dactylographic image by accounting for image reproduction variance associated with the mobile device.

45. The mobile device of claim 39, wherein the processor, in response to executing the program code, encodes the dactylographic image of a quality suitable for biometric matching into live biometric sample data.

46. The mobile device of claim 39, wherein the processor, in response to executing the program code, performs a biometric comparison between the live biometric sample data and data corresponding to at least one reference biometric sample.

47. The mobile device of claim 39, wherein the processor, in response to executing the program code stored in the memory, acquires multiple dactylographic images of the skin surface of the person, each of the multiple dactylographic images being acquired with one or more different focal properties, and combines the multiple dactylographic images to produce a composite dactylographic image of the skin surface of the person.

48. The mobile device of claim 39, wherein the processor, in response to executing the program code stored in the memory, automatically downloads a calibration configuration file from a web service for loading onto the mobile device during setup.

49. The mobile device of claim 39, wherein the memory further stores a calibration configuration file preinstalled on the mobile device for use during setup.

50. A dactylographic image-capture system comprising:
a mobile device with a native camera having a lens, memory storing program code that, when executed, processes dactylographic images of skin surfaces of people acquired by the camera, and a processor configured to execute program code stored in memory in response to the camera acquiring a dactylographic image of a skin surface of a person, the processor, in response to executing the program code, adjusting the acquired dactylographic image of the skin surface of the person to produce a dactylographic image of a quality suitable for biometric matching; and an attachment mechanism that holds a non-powered optical module that supplies the dactylographic image to the camera, the optical module comprising:
a housing having a side with an aperture formed therein, and a window framing a transparent surface that contacts a skin surface of a person;
a lighting mechanism that provides light to illuminate the skin surface of the person placed upon the transparent surface;
a prism having:
a first side facing the lighting mechanism,
a second side facing the window that frames the transparent surface to contact the skin surface of the person, and
a third side through which a dactylographic image of the skin surface of the person exits the prism; and
a plurality of light reflecting surfaces within the housing spatially separated from the prism, the plurality of light reflecting surfaces disposed within the housing to reflect the dactylographic image of the skin surface of the person exiting the prism towards the aperture in the side of the housing toward the camera,
wherein the lens of the native camera of the mobile device aligns with the aperture in the side of the housing to receive the dactylographic image of the skin surface passing therethrough.

51. The dactylographic image-capture system of claim 50, wherein the skin surface of the person comprises one or more fingertips, and the dactylographic image of the skin surface of the person comprises a fingerprint image.

52. A non-powered optical module, comprising:
a housing with a diffuser window that diffuses ambient light, a frame portion with an aperture, and a second window framing a transparent surface used to contact a skin surface of a person, the frame portion coupling the optical module to a mobile device with a built-in camera such that the aperture of the frame portion aligns with a lens of the camera of the mobile device;
a prism disposed in the housing with a first side of the prism at the second window and a second side of the prism facing the diffuser window, the diffused ambient light entering the housing through the diffuser window illuminating the skin surface of the person that is in contact with the transparent surface; and
a lens disposed within the housing to focus a dactylographic image of the skin surface exiting the prism and propagating towards the aperture in the frame portion.

53. The optical module of claim 52, wherein the skin surface of the person comprises one or more fingertips, and the dactylographic image of the skin surface comprises a fingerprint image.

54. The optical module of claim 52, further comprising a light reflecting surface disposed within the housing to reflect the ambient light entering through the diffuser window towards the second side of the prism in order to illuminate the one or more fingertips that are in contact with the transparent surface.

55. The optical module of claim 52, wherein the lens abuts a third side of the prism.

56. The optical module of claim 52, further comprising one or more light reflecting surfaces disposed within the housing to reflect the fingerprint image exiting the prism into the aperture of the frame portion and, thereby, into the lens of the camera aligned with the aperture.

\* \* \* \* \*